July 1, 1958     P. N. HEERE     2,841,421
PACKING OF RINGS, DISCS AND OTHER TRAY-LIKE DIVISIONAL
WALLS IN PIPES, TOWERS, COLUMNS
AND OTHER SUCH VESSELS
Filed March 25, 1955
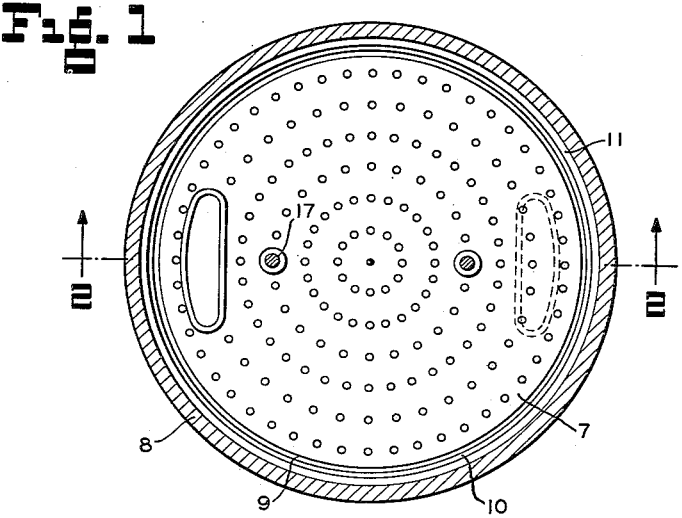
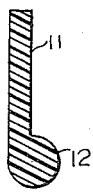
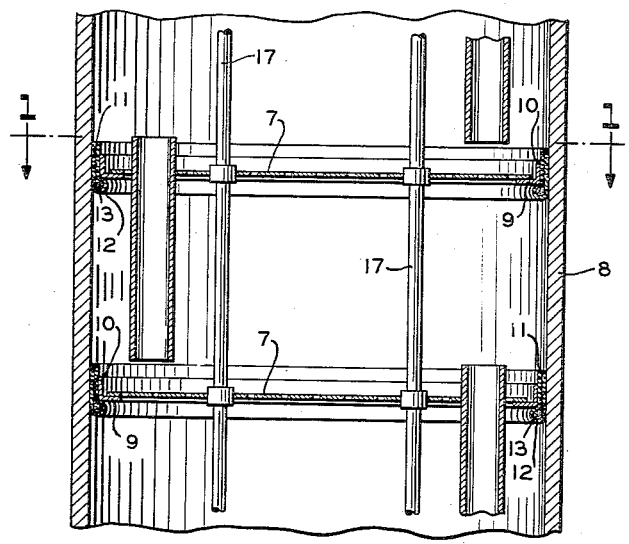
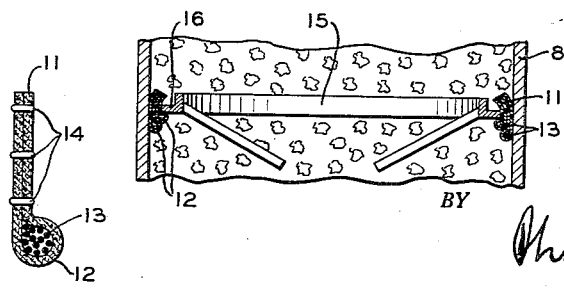
*INVENTOR.*
PETER N. HEERE
BY
*Philip S. McDeane*
ATTORNEY United States Patent Office 2,841,421
Patented July 1, 1958

2,841,421

PACKING OF RINGS, DISCS, AND OTHER TRAY-LIKE DIVISIONAL WALLS IN PIPES, TOWERS, COLUMNS AND OTHER SUCH VESSELS

Peter N. Heere, Livingston, N. J.

Application March 25, 1955, Serial No. 496,649

5 Claims. (Cl. 286—1)

The invention herein disclosed relates to the mounting and packing of rings, plates, bubble trays and the like in vessels such as used for various fractionating, absorption, extraction, distillation, gas or liquid mixing or entrainment separating purposes.

In such operations it is necessary to prevent liquid or gas flow between the inserted parts and the walls of the vessel. This has made the packing of the separating or divisional walls to the vessel an important feature of the over-all construction and many attempts have been made to meet the problem. Such constructions have involved use of packing rings, bolt and screw clamps and other more or less complicated and unwieldy expedients.

The objects of the present invention are to provide a simple, inexpensive construction which can be easily assembled and which will automatically seal the trays or other inserted parts to the shell of the vessel and which will compensate for out of round or variation in diameter or other such irregular conditions.

Other special objects of the invention are to provide a simple, efficient form of packing which can be applied to a ring, plate or other such separating element and which will be tightened and sealed the more firmly to the wall of the vessel in the act of locating the element in its position in the vessel.

A further special object of the invention is to provide the packing in a form which may be used, more or less, as required, to compensate for greater or less differences in the diameters of the inserted elements and the containing vessel.

Other desirable objects attained by the invention and the novel features of construction through which such objects are accomplished are set forth and will further appear in the course of the following specification.

The drawing accompanying and forming part of the specification is illustrative of certain present practical embodiments of the invention but it will be appreciated that structure may be modified and changed as regards such illustration, all within the true intent and scope of the invention as hereinafter defined and claimed.

Fig. 1 in the drawing is a cross-sectional view of a tower or column having perforated screens mounted therein by means of the present invention, this view being taken on substantially the plane of line 1—1 of Fig. 2;

Fig. 2 is a broken vertical sectional view of the same tower, as taken on line 2—2 of Fig. 1;

Fig. 3 is an enlarged cross-sectional detail of one form of the packing strip;

Fig. 4 is a broken sectional view similar to Fig. 2, showing the invention as applied to the mounting of redistributor rings in packed towers of the type covered by Patent No. 2,639,130 of May 19th 1953.

Fig. 5 is a cross-sectional view of a one piece molded form of the packing.

In Figs. 1 and 2 the invention is shown applied to the mounting of perforated screens 7 in a sieve tray column 8. In this instance the sieve plates are shown as supported on the horizontal flanges 9 of angle iron cross-section rings having upstanding flanges 10 for cooperation with the wall of the containing vessel.

The packing in this particular instance, as shown more fully in the detail view, Fig. 3, is made up of a strip 11 of compressible and more or less elastic fibrous material folded along the center at 12 about a cord-like filler 13 and having the sides of the folded strip secured together by stitching or the like at 14.

This packing strip may be of different flexible materials which will withstand the temperature, pressure and possibly corrosive effects that might be encountered in use.

Preferably, because of the pressure and friction to which it may be subjected on installation, a woven fabric is employed such as made from flexible asbestos, glass cloth or fabric tape, folded or with the edge turned over to produce the bead or enlargement along the edge.

As a further variation the packing strip may be molded as a flexible ring of plastic or other solid compressible packing material having a flange or enlargement forming the bead 12 along one edge as shown in Fig. 5.

Figs. 2 and 4 show how with such a construction, the bead on the lower edge of the packing strip will work in under the edge of the ring or other inserted member to form a solid abutment for that member and to prevent stripping of the packing off the member when it is pushed into position in the containing vessel.

Ordinarily no other preparation is necessary than to wrap one or more turns of the strip about the rim of the ring or plate with the bead or enlargement beneath the bottom of the plate and securing it thus in place by a glue or cement.

If the inserted member is nearly the size of the container, only one turn of packing need be used but other turns may be wrapped on to take up greater differences in diameters and to provide, when desired, greater compressibility. Thus the amount of packing may be varied to suit different conditions encountered, such as tightness of fit required or to compensate for out of round, variations in diameter of the vessel and other such conditions.

The bead on the lower edge of the packing prevents the packing from stripping from the inserted piece and serves to wedge the packing firmly and tightly in place as the piece is forced down to final position in the vessel. The expansibility of the packing makes it self-compensating to variations in size as the piece is forced into place. Thus, if the vessel is made to change slightly in diameter or in shape as the piece is inserted, the packing may have sufficient elasticity to allow for these variations and to compress or expand as needed to maintain tight fit under all circumstances.

The invention may be used for flanged or plain edge inserted pieces, as indicated in Figs. 2 and 4. The latter view shows a packed tower with redistributing rings 15 such as disclosed in the Heere Patent No. 2,639,130.

In such construction the rings have plain narrow edge portions 16 and the packing strips are wrapped about these narrow or thin edges with the beads 12 underlying the bottom of the rings the same as first described.

It will be apparent that the invention may be applied to many different kinds of vessels and for many different forms of inserted elements such as plates, bubble trays, rings, discs, sieves and the like.

In all such uses liquid or vapor leakage between the wall of the vessel and the edge of the inserted piece is prevented.

The parts are automatically sealed and secured in the act of forcing the inserted piece into position in the vessel. Spacer rods 17 or other usual or special spacing means may be provided for definitely fixing the trays or other elements in desired spaced relation.

The invention provides a simple, practical, inexpensive and readily applied packing which may be used as much as required to fit the parts being sealed together and which can be inserted with as much force as needed without stripping the packing from the inserted piece. The invention does not require any changes to be made or additions to be applied to either the vessel or the inserted pieces.

What is claimed is:

1. In combination, a containing vessel, an inserted member conforming to the surrounding wall of said containing vessel and having a rim spaced from said surrounding wall of the containing vessel, a strip of flexible, compressible packing material resistant to high temperature, pressure and chemicals in said containing vessel interposed and compressibly held in the space between the rim of said member and the surrounding wall of said containing vessel, said strip of packing material having a bead enlargement along its lower edge, said bead being wedged between the surrounding wall of the containing vessel and the lower edge of the rim on said member, whereby said member is secured in pressure-tight engagement to the surrounding wall of the containing vessel.

2. The invention according to claim 1, with at least two layers of said strip wound one layer over the other about the rim of said member and the bead on the lower edge of the layers disposed beneath said member.

3. The invention according to claim 1, with said strip folded longitudinally on itself and a cord-like element held in the fold of the strip and providing the bead along the lower edge of the strip.

4. The invention according to claim 1, with said strip folded longitudinally on itself along the lower edge of the strip and forming the bead aforesaid.

5. The invention according to claim 1, with said strip consisting of a molded material complete with a molded bead.

References Cited in the file of this patent
UNITED STATES PATENTS

| | | |
|---|---|---|
| 1,009,303 | Hansen | Nov. 21, 1911 |
| 1,122,574 | Cobb | Dec. 29, 1914 |
| 1,533,490 | Wirfs | Apr. 14, 1925 |
| 2,657,826 | Ludowitz | Nov. 3, 1953 |